United States Patent
Botos et al.

(12)
(10) Patent No.: US 6,442,851 B1
(45) Date of Patent: Sep. 3, 2002

(54) DIRECT DRIVE TILT AND GONIOMETER STAGE

(75) Inventors: Stephen J. Botos, Pittsburgh, PA (US); Albert P. Ciez, Murrysville, PA (US); Brian L. Favero, New Kensington, PA (US)

(73) Assignee: Aerotech, Inc., Pittsburgh, PA (US)

( * ) Notice: Subject to any disclaimer, the term of this patent is extended or adjusted under 35 U.S.C. 154(b) by 0 days.

(21) Appl. No.: 09/862,097

(22) Filed: May 21, 2001

(51) Int. Cl.[7] ................................................ G01B 7/30
(52) U.S. Cl. ........................... 33/1 N; 33/1 M; 33/706
(58) Field of Search ...................... 33/1 M, 1 N, 1 PT, 33/534, 536, 537, 568, 569, 573, 706, 710; 248/542, 550; 269/55, 58, 63

(56) References Cited

U.S. PATENT DOCUMENTS

| | | | | |
|---|---|---|---|---|
| 3,744,138 A | * | 7/1973 | Schuler | 33/534 |
| 4,147,405 A | | 4/1979 | Spainhour | 350/96.21 |
| 4,543,724 A | * | 10/1985 | Shiba et al. | 33/1 N |
| 4,575,942 A | * | 3/1986 | Moriyama | 33/1 M |
| 4,676,649 A | * | 6/1987 | Phillips | 33/1 M |
| 5,760,500 A | * | 6/1998 | Kondo et al. | 33/1 M |
| 6,151,919 A | | 11/2000 | Hulten et al. | 65/501 |
| 6,347,458 B1 | * | 2/2002 | Kaczynski | 33/573 |

FOREIGN PATENT DOCUMENTS

| | | |
|---|---|---|
| EP | 0258569 | 3/1988 |
| EP | 0319041 | 6/1989 |

OTHER PUBLICATIONS

Aerotech catalog entitled "Automation Solutions for the Fiber–Optics Industry", pp. 1–20, 2000, no month.

* cited by examiner

Primary Examiner—G. Bradley Bennett
(74) Attorney, Agent, or Firm—Webb Ziesenheim Logsdon Orkin & Hanson, P.C.

(57) ABSTRACT

A low profile tilt stage comprises a planar base, a cradle defining a cylindrical surface having a cylindrical axis parallel to the base, a table mounted on the cradle by curvilinear bearings, a curvilinear direct drive brushless motor between the cradle and table, and an encoder reader fixed relative to the base and an encoder scale fixed to the table.

9 Claims, 4 Drawing Sheets

DIRECT DRIVE TILT AND GONIOMETER STAGE

FIELD OF THE INVENTION

This invention relates to the field of direct drive mechanical tilt and goniometer stages for precision motion control. More specifically, it relates to linear motor driven stages useful in the alignment of optic fibers.

BACKGROUND OF THE INVENTION

Optic fibers are being used more and more for the transfer of information due to the large bandwidth and insensitivity to certain types of electromagnetic interference. Optic fibers are transparent glass fibers through which light waves encoded with information are passed. The fibers themselves are often less than 100 nm in diameter. Typically, they are enclosed in a protective coating. The fibers are not infinitely long and, therefore, it is necessary to align and bond fibers together. The alignment must be very precise, that is, the centers of the fibers must be aligned in order to minimize power loss across a bonded joint. Not only must fibers be joined end to end, fibers must be connected to tiny components, such as transmitters, amplifiers, and receivers. This process is referred to in the industry as pig-tailing.

In order to position fibers for fiber-to-fiber bonding or pig-tailing automatically, mechanical positioning stages with extremely high resolution and repeatability are required. Very often, the bonding and pig-tailing take place in clean rooms. The expense of building and maintaining clean rooms is directly related to the volume of the room. Hence, miniaturization of the mechanical positioning stages for use in optic fiber alignment is extremely critical.

The extent of the motion required to execute the final fiber alignment is on the order of 100's of microns. This is due to the relatively small size of the fiber itself. Core diameters vary from 200 microns for multi-mode fibers down to 9 microns for single-mode fibers. The relatively small distances required to align the fibers are dwarfed by the size of even the smallest positioning stages now in successful use.

It is an advantage, according to the present invention, to provide a low profile tilt stage that has a combination of a small footprint, high speed, high accuracy, high repeatability, and high position stability that make it a superior choice for fiber alignment applications.

SUMMARY OF THE INVENTION

Briefly, according to the present invention, there is provided a low profile tilt stage comprising a planar base, a cradle defining a cylindrical surface having a cylindrical axis parallel to the base, a table mounted on the cradle by curvilinear bearings for rotation around the cylindrical axis of the cradle, and a curvilinear direct drive brushless motor between the cradle and table. The motor comprises an armature winding nested in the cradle and a rare earth permanent magnet track mounted on the underside of the table. An encoder reader is fixed relative to the base and an encoder scale is fixed to the table.

Preferably, the tilt table of the low profile tilt stage has a flat upper surface and a convex cylindrical lower surface having a cylindrical axis identical with the cylindrical axis of the base. According to one embodiment, a cylindrical magnetic focusing plate is positioned between the magnet track and the table and a cylindrical magnetic focusing cradle is positioned between the base and the armature winding.

Preferably, the low profile tilt stage is supported by the curvilinear bearings positioned on each axial side of the curvilinear direct drive motor and the curvilinear bearings comprise one race secured in a cradle resting on the base and the other race is secured to the table.

Most preferably, the armature winding is a slotless three-phase bifurcated winding.

According to another embodiment of the present invention, there is provided a goniometer comprising two non-identical tilt stages as above described mounted together with tilt axes lying in perpendicular planes.

In one configuration of this embodiment, a first tilt stage has a planar base, a cradle defining a cylindrical surface with a radius of curvature R1 and a cylindrical axis parallel to the base. A table is mounted on the cradle by curvilinear bearings for rotation around the cylindrical axis of the cradle. A curvilinear direct drive brushless motor is positioned between the cradle and table. The motor comprises an armature winding nested in the cradle and a rare earth permanent magnet track mounted on the underside of the table. An encoder reader is fixed relative to the base and an encoder scale is fixed to the table. A second tilt stage has a planar base and mounted to the table of the first tilt stage. The second tilt stage has a planar base, and a cradle defining a cylindrical surface with a radius of curvature R2. The cylindrical axes of the first and second stages lie in perpendicular planes and the radii of curvature R1 and R2 are of such length that the cylindrical axes of the first and second tilt stages intersect.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
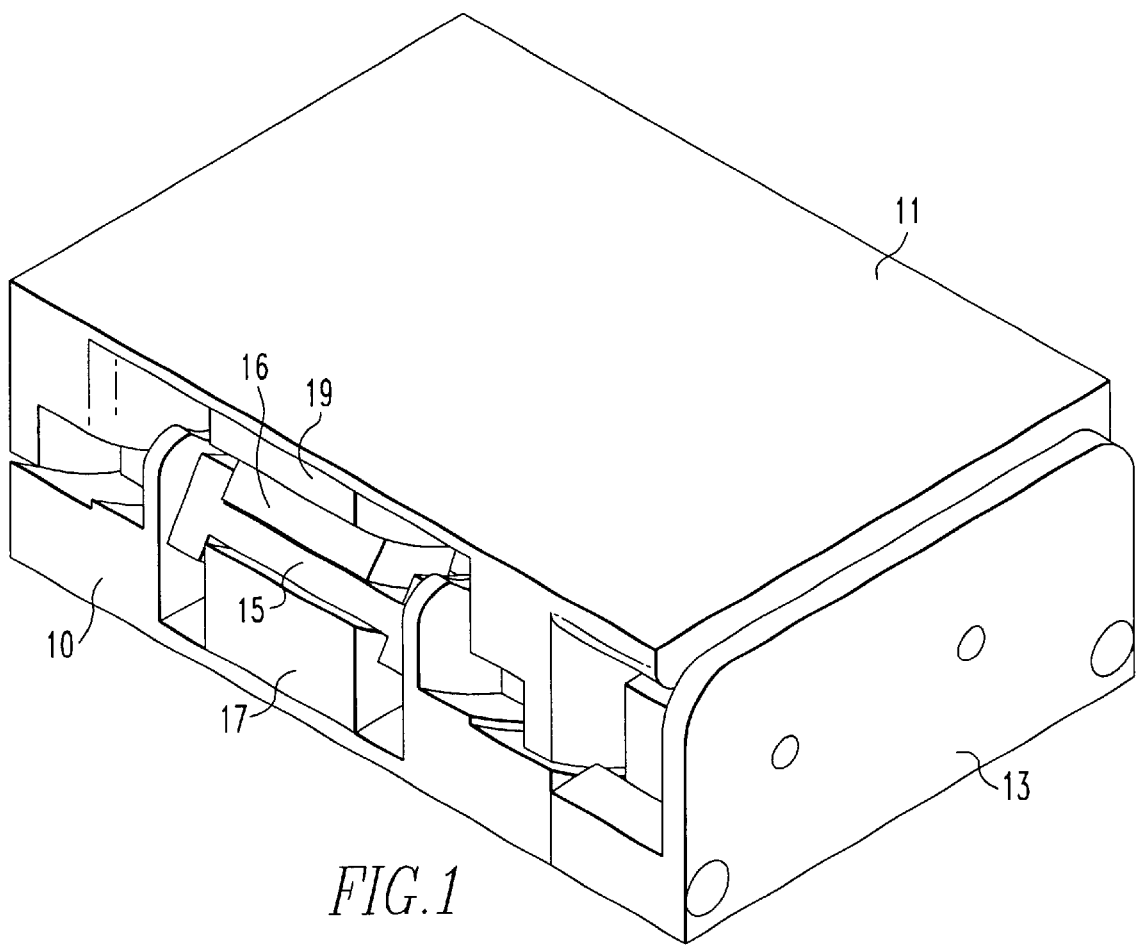
FIG. 1 is a perspective view of a low profile tilt stage, according to the present invention.

Referring to FIG. 1, there is shown a perspective view of a low profile tilt stage, according to the present invention. The tilt stage comprises a base plate 10 having a planar bottom surface and a tilt table 11 that rotates about a tilt axis parallel to the bottom surface of the base plate 10. The base plate 10 and table 11 are preferably machined from aluminum and aluminum alloys to minimize weight but supply the required rigidity. Mounted on one end of the base plate 10 is an end wall section 13. A direct drive non-contact brushless curvilinear motor is mounted between the base plate 10 and the tilt table 11. The motor comprises an armature winding 15 associated with the base plate 10 and a rare earth permanent magnet track 16 associated with the tilt table 11.

A magnetic focusing cradle 17 is mounted between the base plate 10 and the armature winding 15. The focusing cradle 17 serves two functions: it supports the armature winding 15 with the necessary curvature, and it provides a low reluctance return path for the magnetic fields generated by the armature winding 15. A magnetic focusing plate is positioned between the table 11 and the magnet track 16 to provide a low reluctance return path for the fields created by the permanent magnets.

Figure 2:
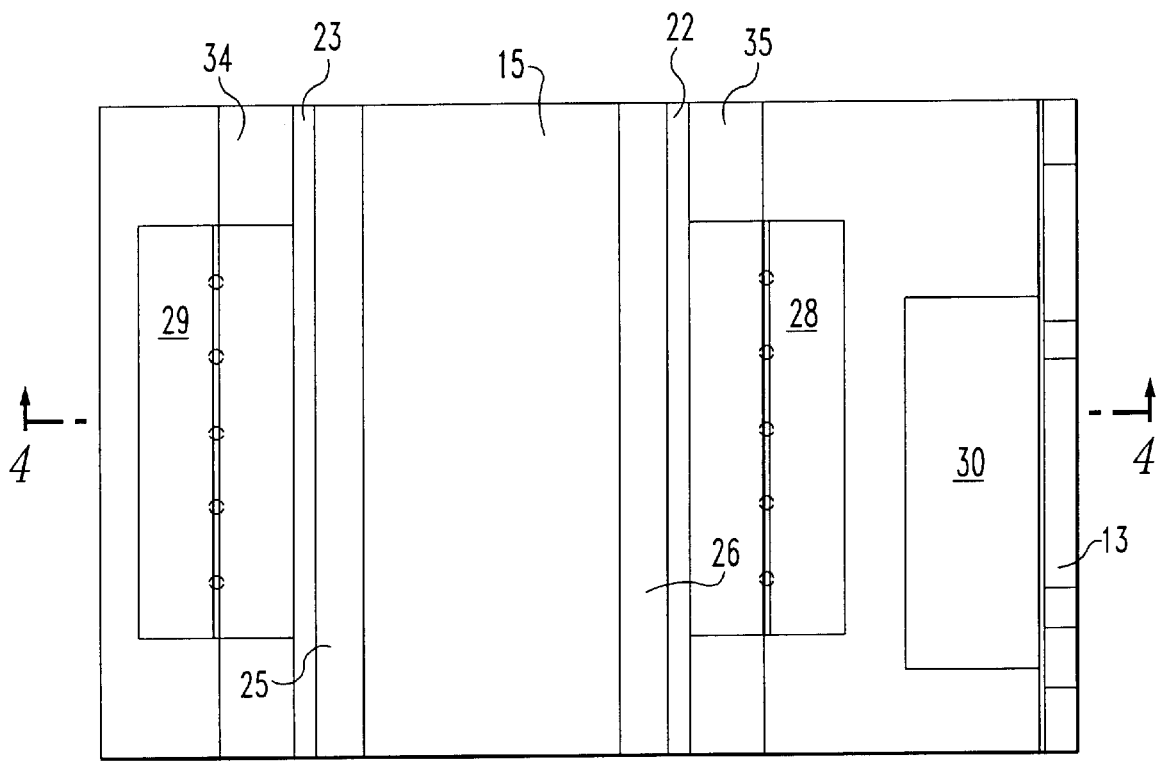
FIG. 2 is a top view of the base plate of a tilt stage as shown in FIG. 1 with the tilt table removed.

Referring to FIG. 2, there is shown a top view of the tilt stage with the table 11 including the magnet track 16 removed. The armature winding 15 is shown positioned between two positioning guides 22 and 23 rising from the base plate 10. Typically, the positioning guides 22 and 23 are machined as part of the base plate 10. The armature winding 15 is a slotless winding with encapsulated legs defining magnetic poles parallel to the tilt axis. Preferably, the winding is a three-phase bifurcated winding. The winding is provided with leads that enable the electronic commutation of the windings to rotate the motor and the tilt table 11 in either the clockwise or counterclockwise direction with exceptional precision. The first prototype of this invention was designed to provide 10 degrees tilt in either direction from horizontal. The end turns that connect the winding legs are also encapsulated and rest in spaces 25 and 26 inside of the positioning guides 22 and 23. As the curvilinear motor is electronically commutated, a Hall effect sensor is mounted to generate commutation signals as the Hall effect sensor encounters the changing polarity of the magnet track. The magnetic pole pitch of the magnet track is less than 16 mm and the armature winding has a coil width of less than about 4 mm.

Curvilinear bearings 28 and 29 are mounted on each side of the armature winding 15. The bearings 28 and 29 rest on cylindrical cradle surfaces 34 and 35 that are supported from or may be machined into base plate 10. The concave cylindrical cradle surfaces 34 and 35 are outside the positioning guides 22 and 23 and have a cylindrical axis parallel to the base. Preferably, the bearings are simply sections of circular bearings having axially facing races with cross-roller bearings therebetween. Suitable bearings are available from the NB Corporation of America and others. In the first prototype, according to the present invention, the bearings had a radius of curvature of 50 mm.

Figure 3:
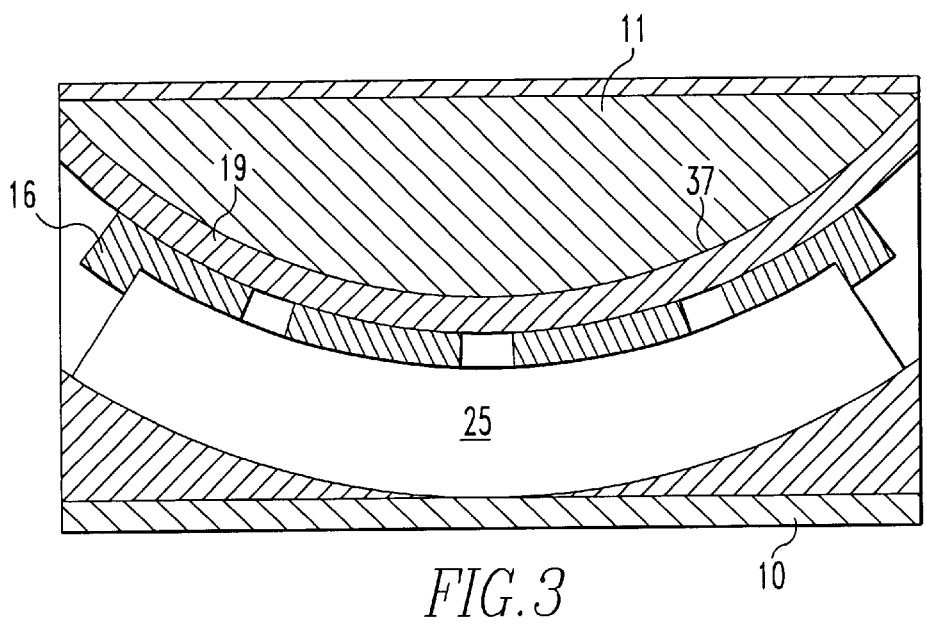
FIG. 3 is a section view of a tilt stage, according to the present invention, taken along lines III—III in FIG. 4.

Referring to FIG. 3, there is shown a section view of the tilt stage in which the side of the curvilinear motor is visible. The armature winding 15 rests in a cradle 17 above described. The cradle 17 is mounted to the base plate 10 and has a concave cylindrical surface having a cylindrical axis that is parallel to the bottom of base plate 10 and colinear with the cylindrical axis of the cradle surfaces 34 and 35.

The underside of the tilt table 11 is provided with a convex cylindrical surface 37 for supporting the focusing magnetic plate 19 and magnet track 16. The cylindrical surface 37 has a cylindrical axis parallel to the base plate 10 and colinear with the cylindrical axis of the cradle surfaces 34 and 35.

Figure 4:
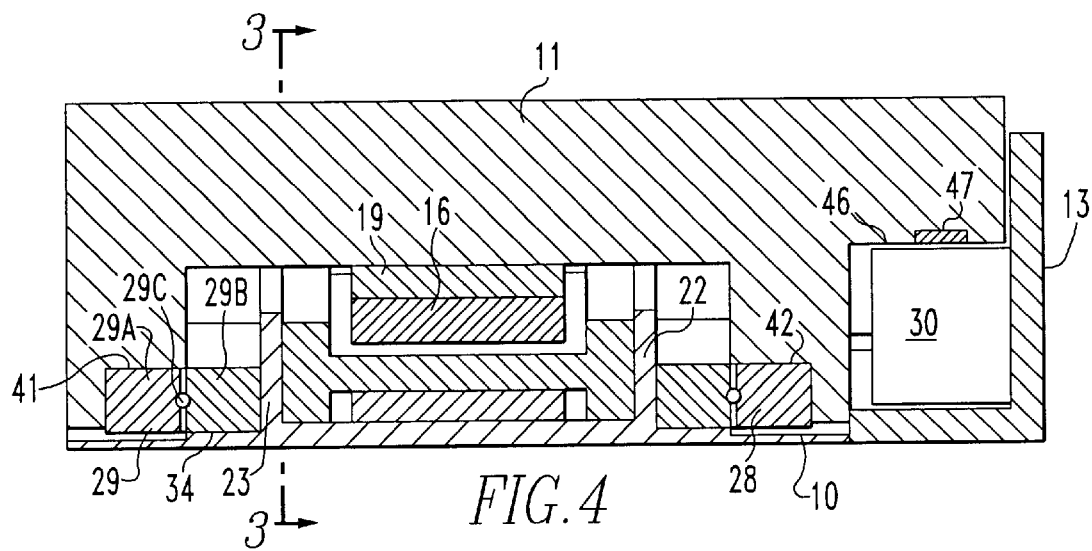
FIG. 4 is a section view taken along lines IV—IV in FIG. 2.
Figure 5:
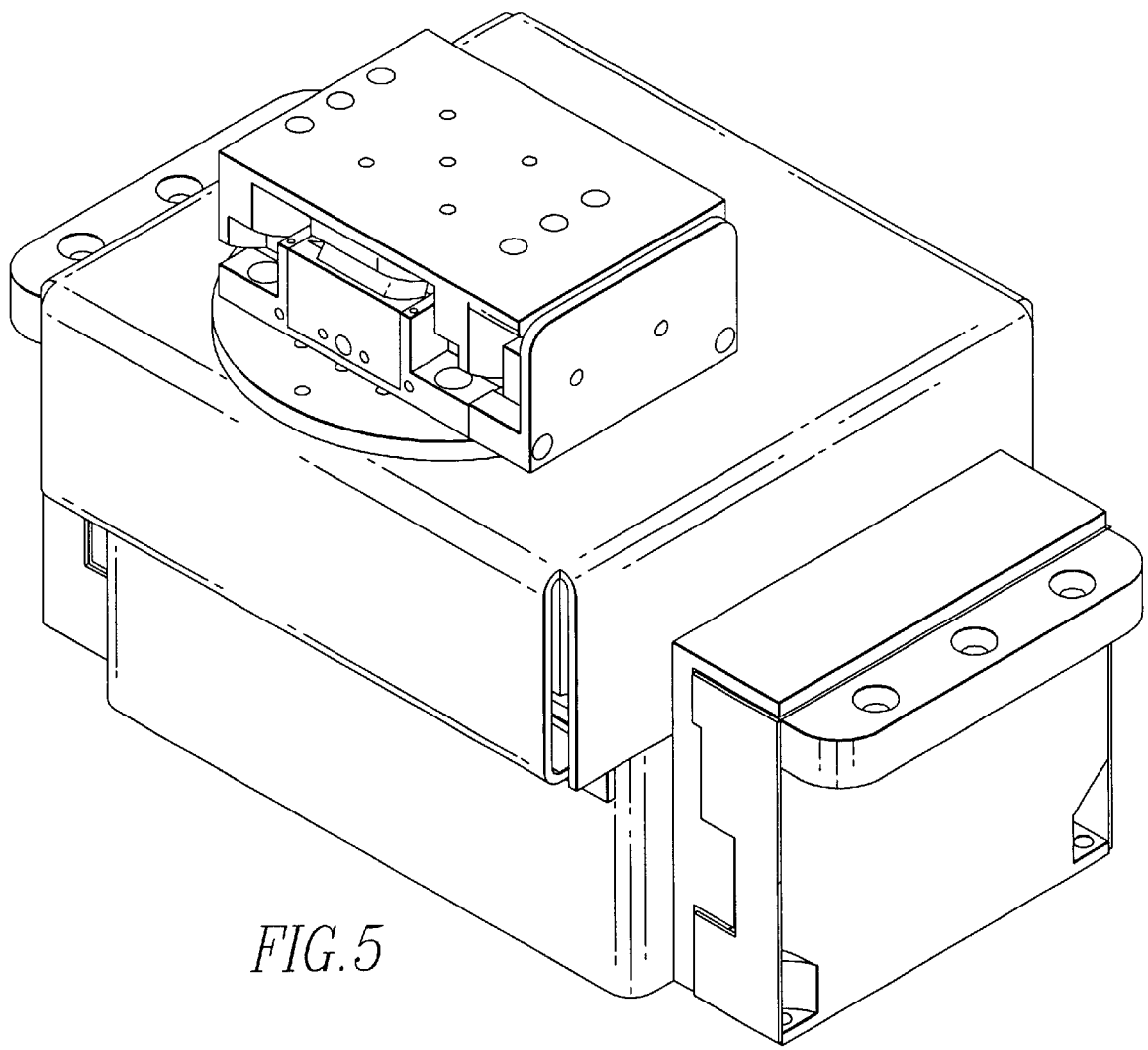
FIG. 5 is a perspective view of a tilt stage, according to the present invention, mounted on an X-Y-Z-Theta stage to provide a five-axis mechanical positioner.

The tilt table 11 is provided with two more convex cylindrical surfaces 41, 42 for supporting the bearings 28 and 29. Referring to the left side of FIG. 4, the outer race (relative to the center of the drawing) 29A is supported by the convex cylindrical surface 41 of the tilt table 11 and the inner race 29B is supported by the concave cylindrical surface 34 of the base plate 10. The races are slideably secured together by the cross rollers 29C. The tilt table 11 supports another convex cylindrical surface 46 for supporting an encoder scale 47. All of the convex cylindrical surfaces on the tilt table 11 have colinear axes.

An encoder reader 30 is positioned below the encoder scale 47. The angular position of the tilt table 11 is precisely controlled by feedback from a linear encoder arranged to provide angular position feedback. A home sensor and limit switches are mounted relative to the tilt table 11 enabling sensing of a home position and the limits of tilt. A suitable encoder comprises an RGH 22 read head manufactured by Renishaw Company along with Renishaw's 20 micron RGS-S tape scale. The encoder reader-scale combination can provide an output resolution of 50 nm. By use of an encoder multiplier, such as the MX Series multipliers manufactured by Aerotech, Inc. of Pittsburgh, Pa., the resolution of the tilt table position can be reduced to 20 nm and even to 10 nm. With a 50 mm radius of curvature for the scale tape support, the angular resolution of the tilt table becomes 0.05 arc-sec.

One of the advantages of low profile tilt stages, according to the present invention, is that they can be stacked one on top of the other to provide a two-axis tilt stage. The rotating axes would be located in perpendicular planes. It is also possible to produce a two-axis goniometer by stacking two tilt stages, according to the present invention, which have different radii of curvature so that the axes of rotation of both stages can be made to intersect. It is possible then to position the end of an optic cable so that it corresponds with the common axis of rotation for both tilt tables. Thus, a rotation about either axis does not cause a linear shift of the optic cable and instability of the mechanical positioner of which it is part is minimized.

Figure 6:
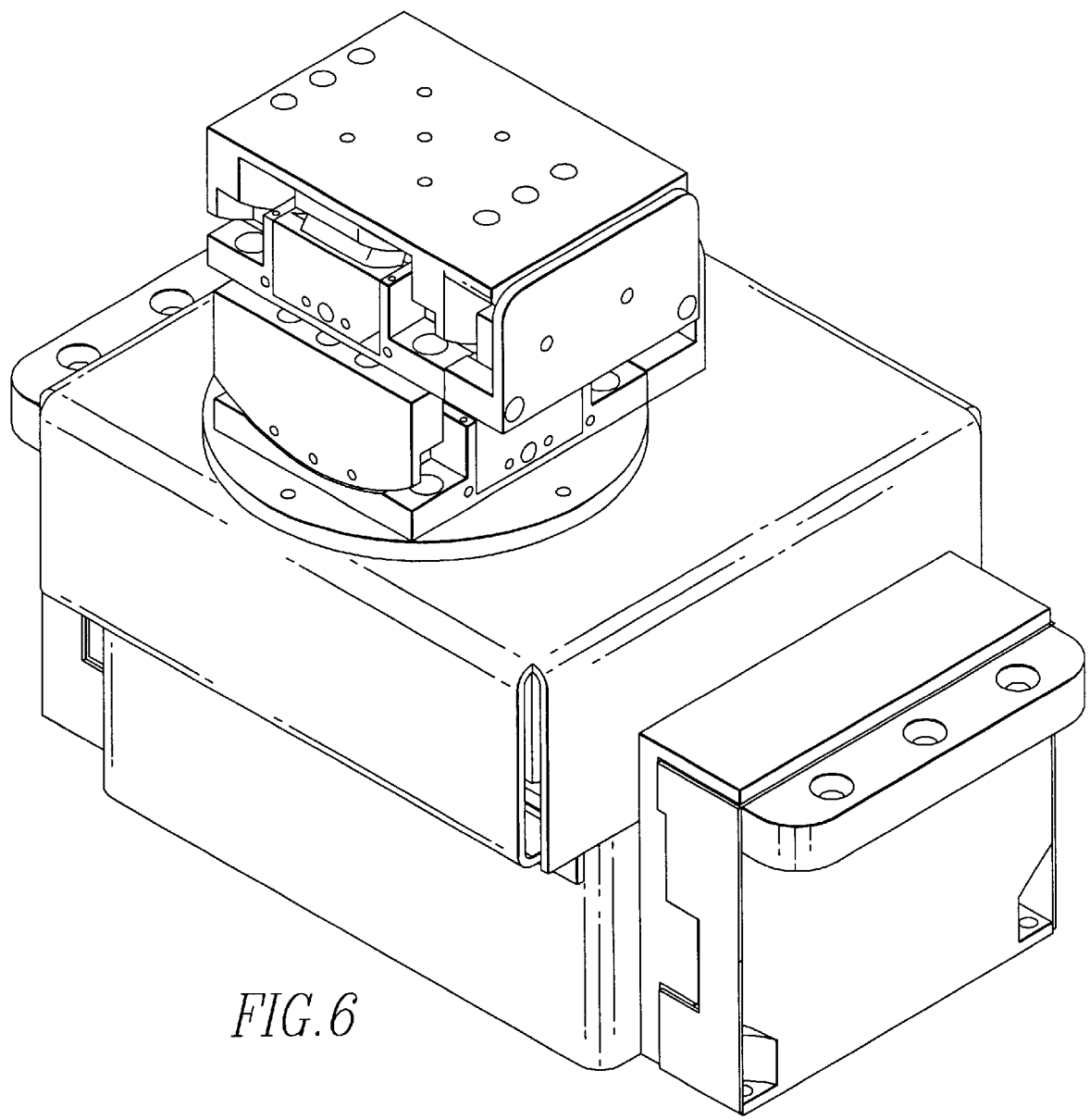
FIG. 6 is a perspective view of two tilt stages, according to the present invention, mounted on top of the other and together mounted on an X-Y-Z-Theta stage to provide a six-axis mechanical positioner.

Referring to FIG. 6, the stacked tilt stages are shown attached to an X-Y-Z-Theta mechanical positioner. As illustrated, each of the tilt stages is identical. Due to the exceptional angular resolution of the tilt tables, it is not necessary to position the end of the optic cable at the axis of both tilt stages. A linear shift can be corrected by the X-Y-Z stages without causing the system to become unstable.

Having thus defined our invention in the detail and particularity required by the Patent Laws, what is desired protected by Letters Patent is set forth in the following claims.

We claim:

1. A low profile tilt stage comprising:

a planar base;

a cradle defining a cylindrical surface having a cylindrical axis parallel to the base;

a table mounted on the cradle by curvilinear bearings for rotation around the cylindrical axis of the cradle;

a curvilinear direct drive brushless motor between the cradle and table, said motor comprising an armature winding nested in the cradle and a rare earth permanent magnet track mounted on the underside of the table; and an encoder reader fixed relative to the base and an encoder scale fixed to the table.

2. The low profile tilt stage according to claim 1, wherein the table has a flat upper surface and a cylindrical lower surface having a cylindrical axis identical with the cylindrical axis of the base.

3. The low profile tilt stage according to claim 2, wherein a cylindrical magnetic focusing plate is positioned between the magnet track and the table and a cylindrical magnetic focusing plate is positioned between the base and the armature winding.

4. The low profile tilt stage according to claim 3, wherein the curvilinear bearings are positioned on each axial side of the curvilinear direct drive motor.

5. The low profile tilt stage according to claim 4, wherein the curvilinear bearings comprise one race secured in a cradle resting on the base and the other race is secured to the table.

6. The low profile tilt stage according to claim 3, wherein the magnetic focusing plate for the magnet track abuts the lower cylindrical surface of the table.

7. The low profile tilt stage according to claim 3, wherein the magnetic focusing plate for the armature winding has a flat surface abutting the base and a curved cradle surface abutting the armature windings.

8. The low profile tilt stage according to claim 1, wherein the armature winding is a three-phase bifurcated winding.

9. A goniometer comprising two non-identical tilt stages comprising:

- a first tilt stage with a planar base;
- a cradle defining a cylindrical surface with a radius of curvature R1 and having a cylindrical axis parallel to the base;
- a table mounted on the cradle by curvilinear bearings for rotation around the cylindrical axis of the cradle;
- a curvilinear direct drive brushless motor between the cradle and table, said motor comprising an armature winding nested in the cradle and a rare earth permanent magnet track mounted on the underside of the table;
- an encoder reader fixed relative to the base and an encoder scale fixed to the table;
- a second tilt stage with a planar base mounted to the table of the first tilt stage;
- a cradle defining a cylindrical surface with a radius of curvature R2 and having a cylindrical axis parallel to the base;
- a stage mounted on the cradle by curvilinear bearings for rotation around the cylindrical axis of the cradle;
- a curvilinear direct drive brushless motor between the cradle and table, said motor comprising an armature winding nested in the cradle and a rare earth permanent magnet track mounted on the underside of the table;
- an encoder reader fixed relative to the base and an encoder scale fixed to the table; and
- the cylindrical axes of the first and second stages lying in perpendicular planes and the radii of curvature R1 and R2 of such length that the cylindrical axes of the first and second tilt stages intersect.

\* \* \* \* \*